(12) United States Patent
Wang

(10) Patent No.: US 11,843,295 B2
(45) Date of Patent: Dec. 12, 2023

(54) FLAT-WIRE CONTINUOUS WAVE-WOUND STAGGERED WINDING AND STATOR COMPRISING THE SAME

(71) Applicant: CHANGYINGXINZHI TECHNOLOGY CO., LTD, Taizhou (CN)

(72) Inventor: Jianhuan Wang, Taizhou (CN)

(73) Assignee: CHANGYINGXINZHI TECHNOLOGY CO., LTD, Taizhou (CN)

( * ) Notice: Subject to any disclaimer, the term of this patent is extended or adjusted under 35 U.S.C. 154(b) by 545 days.

(21) Appl. No.: 15/734,207

(22) PCT Filed: Nov. 20, 2018

(86) PCT No.: PCT/CN2018/116327
§ 371 (c)(1),
(2) Date: Dec. 1, 2020

(87) PCT Pub. No.: WO2019/233041
PCT Pub. Date: Dec. 12, 2019

(65) Prior Publication Data
US 2021/0167651 A1 Jun. 3, 2021

(30) Foreign Application Priority Data
Jun. 6, 2018 (CN) .......................... 201810574019.5

(51) Int. Cl.
*H02K 3/28* (2006.01)
*H02K 1/16* (2006.01)

(52) U.S. Cl.
CPC .............. *H02K 3/28* (2013.01); *H02K 1/16* (2013.01); *H02K 2213/03* (2013.01)

(58) Field of Classification Search
CPC ......... H02K 3/28; H02K 1/16; H02K 2213/08
(Continued)

(56) References Cited

U.S. PATENT DOCUMENTS

| 2,461,296 A * | 2/1949 | Arthur ..................... H02K 1/16 |
| | | 310/216.049 |
| 2007/0180682 A1 | 8/2007 | Ueda et al. |

(Continued)

FOREIGN PATENT DOCUMENTS

| CN | 1202028 A | 12/1998 |
| CN | 1665101 A | 9/2005 |

(Continued)

OTHER PUBLICATIONS

International Search Report issued in corresponding International Application No. PCT/CN2018/116327; dated Mar. 1, 2019; State Intellectual Property Office of the P.R. China, Beijing, China, 5 pgs.

(Continued)

*Primary Examiner* — Terrance L Kenerly
(74) *Attorney, Agent, or Firm* — HAUPTMAN HAM, LLP

(57) ABSTRACT

The present invention discloses a flat-wire continuous wave-wound staggered winding and a stator including same, relating to the technical field of motor manufacturing. The flat-wire continuous wave-wound staggered winding consists of an incoming line end wire portion, an outgoing line end wire portion, and S-shaped wave wires. The S-shaped wave wires include an effective side portion, a straight wire portion, and an end portion, wherein a staggered winding portion is provided in the S-shaped wave wires. The staggered winding portion is arranged in a staggered manner between the wires in each phase of the wires. The present invention achieves single three-phase control for motors or generators with different numbers of slots distributed per pole per phase, thereby simplifying motor circuits and reducing manufacturing costs. The second harmonic of the motor can be reduced, and the noise of the motor can be lowered, thereby improving the product quality.

4 Claims, 14 Drawing Sheets

(58) Field of Classification Search
USPC .................................................. 310/207, 208
See application file for complete search history.

(56) References Cited

U.S. PATENT DOCUMENTS

2009/0322178 A1* 12/2009 Dobashi .................. H02K 3/12
                                                              310/195
2015/0076953 A1     3/2015 Tamura

FOREIGN PATENT DOCUMENTS

| CN | 106787337 A | 5/2017 |
| CN | 108539891 A | 9/2018 |
| CN | 109842251 A | 6/2019 |

OTHER PUBLICATIONS

Written Opinion issued in corresponding International Application No. PCT/CN2018/116327; dated Mar. 1, 2019, State Intellectual Property Office of the P.R. China, Beijing, China, 6 pgs.

* cited by examiner

FLAT-WIRE CONTINUOUS WAVE-WOUND STAGGERED WINDING AND STATOR COMPRISING THE SAME

RELATED APPLICATIONS

The present application is a National Phase of International Application Number PCT/CN2018/116327 filed Nov. 20, 2018 and claims priority to Chinese Application Number 201810574019.5 filed Jun. 6, 2018.

TECHNICAL FIELD

The present invention relates to the technical field of motor manufacturing, in particular to an alternating current motor, including a motor and a generator, and specifically to a flat-wire continuous wave-wound staggered winding and a stator comprising the flat-wire continuous wave-wound staggered winding.

BACKGROUND

For a rotary motor, in order to enhance the performance of the rotary motor, it is necessary to increase the space factor of the stator in the slot and increase the slot fill factor. Therefore, it is a feasible and effective method to use a flat wire with a rectangular cross-section as the material for forming a stator winding.

The Chinese invention patent with the application number 981078494 filed on Mar. 26, 1998 discloses an alternator for an automotive vehicle, and discloses that: the multi-phase stator winding includes a plurality of electric conductors. The plurality of electric conductors constitutes at least one pair, and i inserted in the slots so as to constitute an inner layer and an outer layer arranged in a depth direction of each slot. The electric conductors are insulated from each other in each slot, and the plurality of electric conductors is partly disposed out of the slots so as to extend from an end face of the stator core and form coil ends. The coil ends have a predetermined connecting pattern according to which two of the electric conductors disposed in different slots as different layers are serially connected, thereby forming a coil end group chiefly repeating the connecting pattern at the end face of the stator core. According to this arrangement, each electric conductor can be configured into a simplified shape extending in one direction. Thus, the manufacturing process for the electric conductor can be simplified. Moreover, it becomes possible to push the pre-processed electric conductors into the slot from its radial peripheral side. This is advantageous compared with an assembling method for inserting the electric conductor from an axial direction. The manufacturing process can be simplified, and the space factor can be further improved.

In the above stator winding, the serial connection is implemented by means of U-shaped pieces, so each U-shaped piece needs to be welded. If a welding point fails, it often affects the quality of the product. In order to improve the stability and reliability of a motor stator, a flat-wire wave winding process requiring no welding points needs to be adopted to place the wire coil. In this regard, the Chinese invention patent with the application number 2017112001418 filed on Nov. 27, 2017 by the applicant discloses a method for manufacturing a wave-wound coil stator core, including a step of inserting insulating paper, a step of winding a wave coil, a step of embedding the wave coil into a die core, a step of pushing the die core coil into a stator core, a step of removing the stator core, and a step of fixing the wave coil. According to the method, a stator wire is wound into a S-shaped wave wire, and the number and length of waves to be wound into are determined according to the number of core slots and the number of winding layers; by winding into a S-shaped wave coil, there are no welding points on the wire coils at both ends of the stator, thereby improving the production efficiency and quality of products; moreover, in the stator core, the wire in the slot body is not limited by the number of layers, and the application range is wide.

However, regarding the above wound S-shaped wave coil, as shown in FIG. 1, during winding, the pitch of the effective side portion of the S-shaped wave wire of each wire in each phase is equal, and the effective side portion of the S-shaped wave wire of each wire in each phase are placed in the stator slot body in sequence. For the above motor stator, the number of slots distributed per pole per phase is equal to the number of controllers needed for control. For example, if there are three slots distributed per pole per phase, a silicon rectifier alternator needs three rectifier bridges for control, and a motor needs three controllers for control; and if there are four slots distributed per pole per phase, a silicon rectifier alternator needs four rectifier bridges for control, and a motor needs four controllers for control. As a result, the motor circuit design is complicated, the manufacturing cost is high, and failures are prone to occur.

SUMMARY

The objective of the present invention is to overcome the technical problem in the prior art that a wave-wound coil winding needs to be controlled by multiple controllers, and to provide a flat-wire continuous wave-wound staggered winding that achieves single three-phase control for motors having different numbers of slots. Moreover, the present invention also provides a stator having the flat-wire continuous wave-wound staggered winding.

To solve the technical problem above, the present invention provides a flat-wire continuous wave-wound staggered winding. The flat-wire continuous wave-wound staggered winding includes an incoming line end wire portion, an outgoing line end wire portion, and wound S-shaped wave wires between the incoming line end wire portion and the outgoing line end wire portion. The S-shaped wave wires include an effective side portion for placing in a stator slot body, a straight wire portion located outside both sides of the slots, and an end portion connected to the adjacent straight wire portion, wherein a staggered winding portion is provided in the S-shaped wave wires. The staggered winding portion is arranged in a staggered manner between the wires in each phase of the wires.

In the flat-wire continuous wave-wound staggered winding, the staggered winding portion is arranged in the middle of the entire wave wires, according to the number of slots q distributed per pole per phase, in wave windings consisting of U-phase, V-phase, and W-phase windings, in the U-phase wires, the pitch $y_1$ of $U_1$ wire is set as: $y_1 = q \times m + (q-1)$, in the formula, y represents the pitch, q represents the number of slots distributed per pole per phase, and m represents the number of phases; and the pitch $y_a$ of the Ua wire is set as: $y_a = q \times m - 1$, where a is set as 2 to 7.

In the V-phase wires, the pitch $y_1'$ of the $V_1$ wire is set as: $y_1' = q \times m + (q-1)$, and the pitch $y_a'$ of the Va wire is set as: $y_a' = q \times m - 1$, where a is set as 2 to 7.

In the W-phase wires, the pitch $y_1''$ of $W_1$ wire $W_1$ is set as: $y_1''=q\times m+(q-1)$, and
the pitch $y_a''$ of the Wa wire is set as: $y_a''=q\times m-1$,
where a is set as 2 to 7.

As another implementation, according to the flat-wire continuous wave-wound staggered winding, a staggered winding portion is provided in wave windings in the same direction in the S-shaped wave wires at an interval of one wave winding, the staggered winding portion is in the winding consisting of U-phase, V-phase, and W-phase windings according to the number of slots q distributed per pole per phase, in the U-phase wires, the pitch $y_1$ of $U_1$ wire is set as: $y_1=q\times m+(q-1)$,
in the formula, y represents the pitch,
q represents the number of slots distributed per pole per phase, and
m represents the number of phases; and
the pitch $y_a$ of Ua wire is set as: $y_a=q\times m-1$,
where a is set as 2 to 7.
In the V-phase wires, the pitch $y_1'$ of $V_1$ wire is set as: $y_1'=q\times m+(q-1)$, and
the pitch $y_a'$ of Va wire is set as: $y_a'=q\times m-1$,
where a is set as 2 to 7.
In the W-phase wires, the pitch $y_1''$ of $W_1$ wire is set as: $y_1''=q\times m+(q-1)$, and
the pitch $y_a''$ of Wa wire is set as: $y_a''=q\times m-1$,
where a is set as 2 to 7.

The present invention further discloses a stator having the flat-wire continuous wave-wound staggered winding according to claim 1. The stator includes a stator core, the stator core includes a yoke and teeth, a slot body is provided in the circumferential direction of the stator core, slot insulating paper is provided in the slot body, a wire winding is provided in the slot insulating paper, the wire winding is a flat-wire continuous wave-wound staggered winding, the flat-wire continuous wave-wound staggered winding includes an incoming line end wire portion, an outgoing line end wire portion, and wound S-shaped wave wires between the incoming line end wire portion and the outgoing line end wire portion, the S-shaped wave wires include an effective side portion for placing in a stator slot body, a straight wire portion located outside both sides of the slot body, and an end portion connected to the adjacent straight wire portion, wherein a staggered winding portion is provided in the S-shaped wave wires, and the staggered winding portion is arranged in a staggered manner between the wires in each phase of the wires.

According to the stator, in the S-shaped wave wires, the staggered winding portion is arranged in the middle of the entire S-shaped wave wires, according to the number of slots q distributed per pole per phase, in wave windings consisting of U-phase, V-phase, and W-phase windings, in the U-phase wires, the pitch $y_1$ of $U_1$ wire is set as: $y_1=q\times m+(q-1)$,
in the formula, y represents the pitch,
q represents the number of slots distributed per pole per phase, and
m represents the number of phases; and
the pitch $y_a$ of Ua wire is set as: $y_a=q\times m-1$,
where a is set as 2 to 7.
in the V-phase wires, the pitch $y_1'$ of $V_1$ wire is set as: $y_1'=q\times m+(q-1)$, and
the pitch $y_a'$ of Va wire is set as:
$y_a'=q\times m-1$,
where a is set as 2 to 7.
in the W-phase wires, the pitch $y_1''$ of $W_1$ wire is set as: $y_137=q\times m+(q-1)$, and
the pitch $y_a''$ of Wa wire is set as: $y_a''=q\times m-1$,
where a is set as 2 to 7.

As another implementation, in the stator, according to the number of slots q distributed per pole per phase, a staggered winding portion is provided in the wave windings in the same direction consisting of U, V, and W three phases at an interval of one wave winding, the staggered winding portion is in the winding consisting of U-phase, V-phase, and W-phase windings, in the U-phase wires, the pitch $y_1$ of $U_1$ wire is set as: $y_1 32\ q\times m+(q-1)$,
in the formula, y represents the pitch,
q represents the number of slots distributed per pole per phase, and
m represents the number of phases; and
the pitch $y_a$ of Ua wire is set as: $y_a=q\times m-1$,
where a is set as 2 to 7.
in the V-phase wires, the pitch $y_1'$ of $V_1$ wire is set as: $y_1'=q\times m+(q-1)$, and
the pitch $y_a'$ of Va wire is set as: $y_a'=q\times m-1$,
where a is set as 2 to 7.
in the W-phase wires, the pitch $y_1''$ of $W_1$ wire is set as: $y_137=q\times m+(q-1)$, and
the pitch $y_a''$ of Wa wire is set as: $y_a''=q\times m-1$,
where a is set as 2 to 7.

Compared with the prior art, the beneficial effects of the present invention are that: 1. single three-phase control can be achieved for motors or generators with different numbers of slots distributed per pole per phase, thereby simplifying motor circuits and reducing manufacturing costs; 2. noise of a motor can be reduced, thereby improving the product quality; and 3. the second harmonic of a motor can be reduced.

Figure 1:
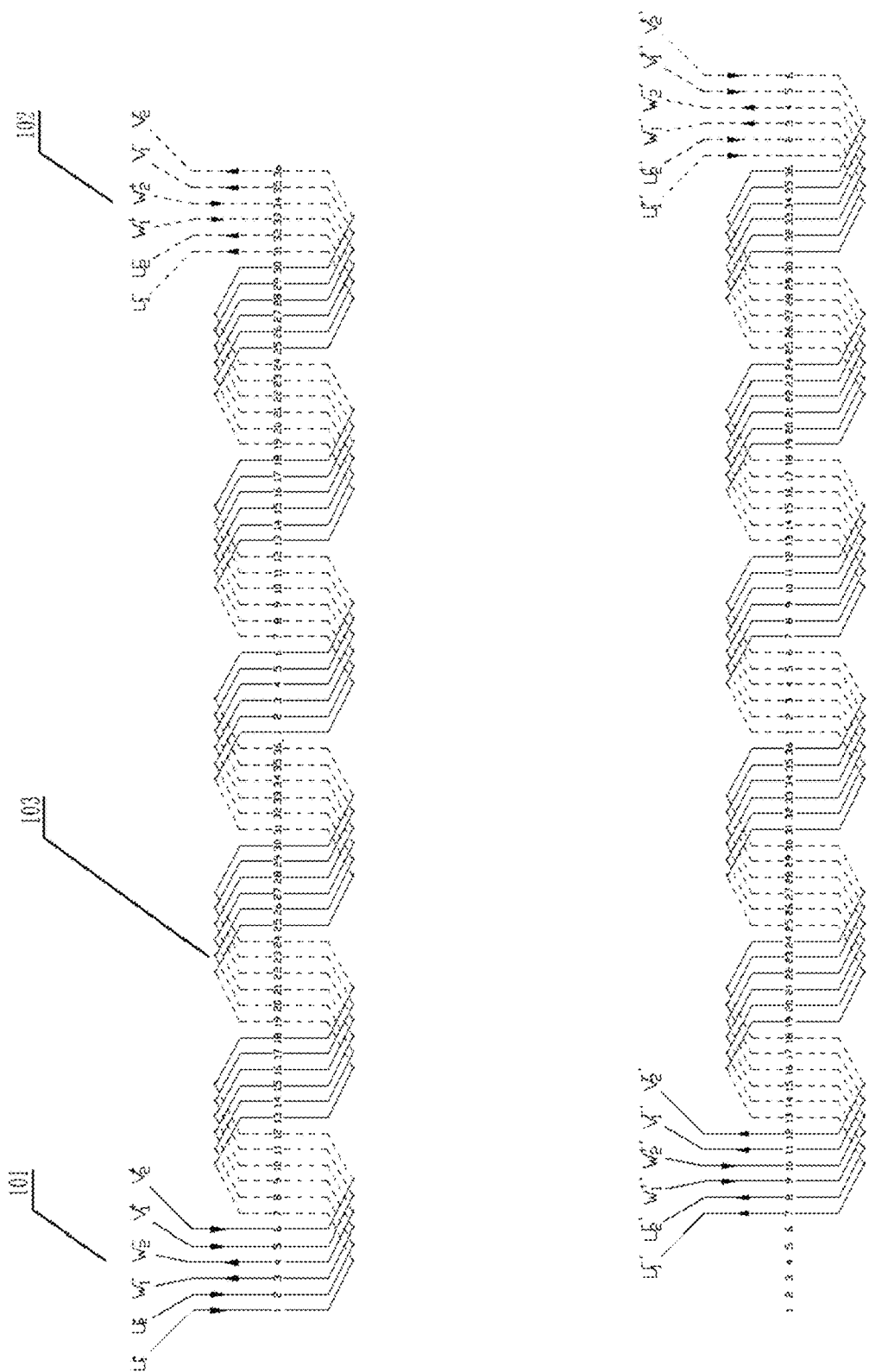
FIG. 1 is an expanded view of a flat-wire continuous wave-wound winding in the prior art.

Reference numerals in drawings: 101—an incoming line end wire portion, 102—an outgoing line end wire portion, 103S—shaped wave wires, 301—an effective side portion, 302—a straight wire portion, 303—an end portion, 104—a staggered winding portion, 105—a stator core, 501—a yoke, 502—a tooth, 503—a slot body.

DETAILED DESCRIPTION

The present invention is further descried blow in combination with the accompanying drawings.

Winding is a general term for a single phase or entire electromagnetic circuit composed of multiple coils or coil groups. Stator winding refers to a winding installed on a stator, that is, flat wire wound around the stator. A stator winding is the key component of a motor to achieve energy conversion, and the technical status of the stator winding is related to the performance of the motor, so it is called the "heart" of the motor. For a high-efficiency motor, a flat-wire wave winding is generally used. A wave winding refers to any two coils connected in series moving forward like waves along the winding direction. As shown in FIG. 1, the advantage of a flat-wire wave winding is that coil groups are continuously connected without interruption and do not need to be connected by welding. In FIG. 1, the solid line represents an upper-layer conductor, and the dashed line represents a lower-layer conductor.

For three-phase motors, the number of slots distributed per pole per phase is different for motors having different slot numbers and pole numbers. The number of slots distributed per phase per pole includes one slot, two slots, three slots, four slots, five slots, six slots, and seven slots. The constitution rules of a three-phase winding are that: the numbers of slots in each phase winding must be equal and the slots are evenly distributed on the stator; the lead positions of the three-phase winding should be spaced 120 electrical degrees apart; and the three-phase winding generally adopts a 60-degree phase band distribution, for example, if a three-phase motor has two slots distributed per pole per phase, slots of the motor differ by 30 electrical degrees, if a three-phase motor has three slots distributed per pole per phase, slots of the motor differ by 20 electrical degrees, if a three-phase motor has four slots distributed per pole per phase, slots of the motor differ by 15 electrical degrees, if a three-phase motor has five slots distributed per pole per phase, slots of the motor differ by 12 electrical degrees, and if a three-phase motor has six slots distributed per pole per phase, slots of the motor differ by 10 electrical degrees.

Figure 2:
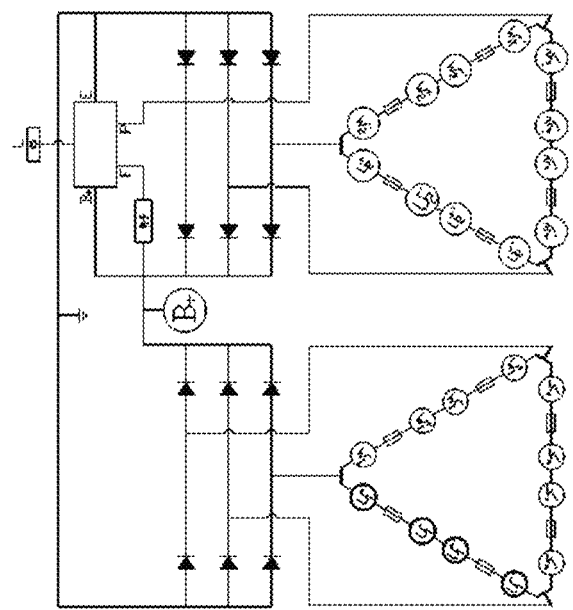
FIG. 2 is a dual three-phase star connection diagram of a silicon rectifier alternator in the prior art and a dual three-phase delta connection diagram of the silicon rectifier alternator.
Figure 2:
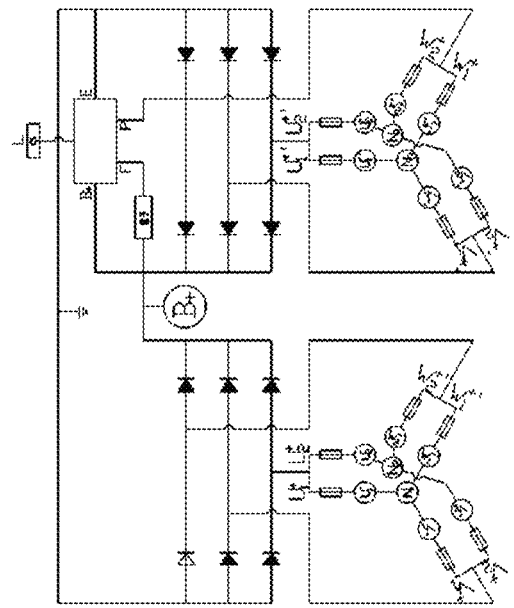
Figure 3:
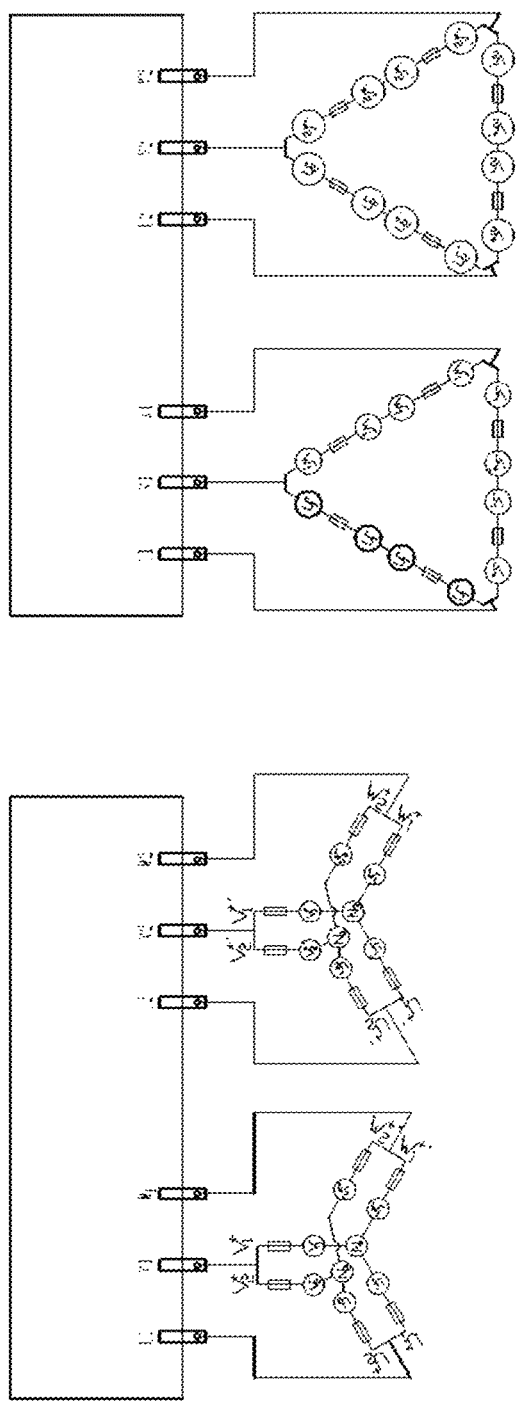
FIG. 3 is a dual three-phase star connection diagram of a motor in the prior art and a dual three-phase delta connection diagram of the motor.

Since motors with different slot numbers and pole numbers have an electrical degree difference between slots, currents on wires of the same phase in different slots cannot enter or exit at the same time. Thus, as shown in FIGS. 2 and 3, if there are three slots distributed per pole per phase, a silicon rectifier alternator needs three rectifier bridges for control, and a motor needs three controllers for control; and if there are four slots distributed per pole per phase, a silicon rectifier alternator needs four rectifier bridges for control, and a motor needs four controllers for control. As a result, the motor control system is complicated and the manufacturing cost is high.

By changing the pitch of the wave-wound coil, the present invention can change the electrical degree difference between wires of the same phase in different slots, and can make currents on wires of the same phase in different slots enter or exit at the same time, thereby achieving single three-phase control of the motor.

Figure 4:
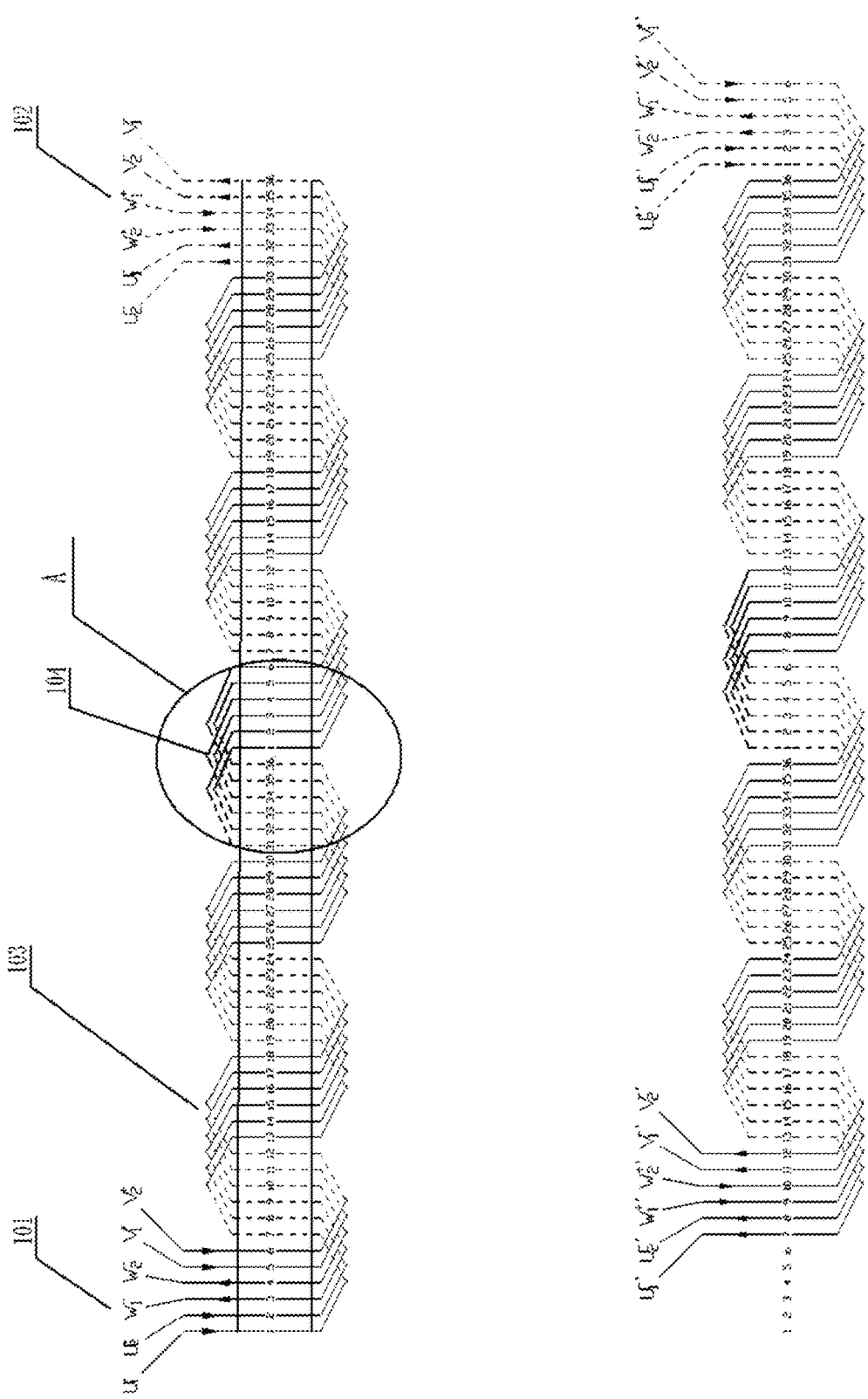
FIG. 4 is an expanded view of a winding in embodiment 1 of a flat-wire continuous wave-wound staggered winding according to the present invention.
Figure 5:
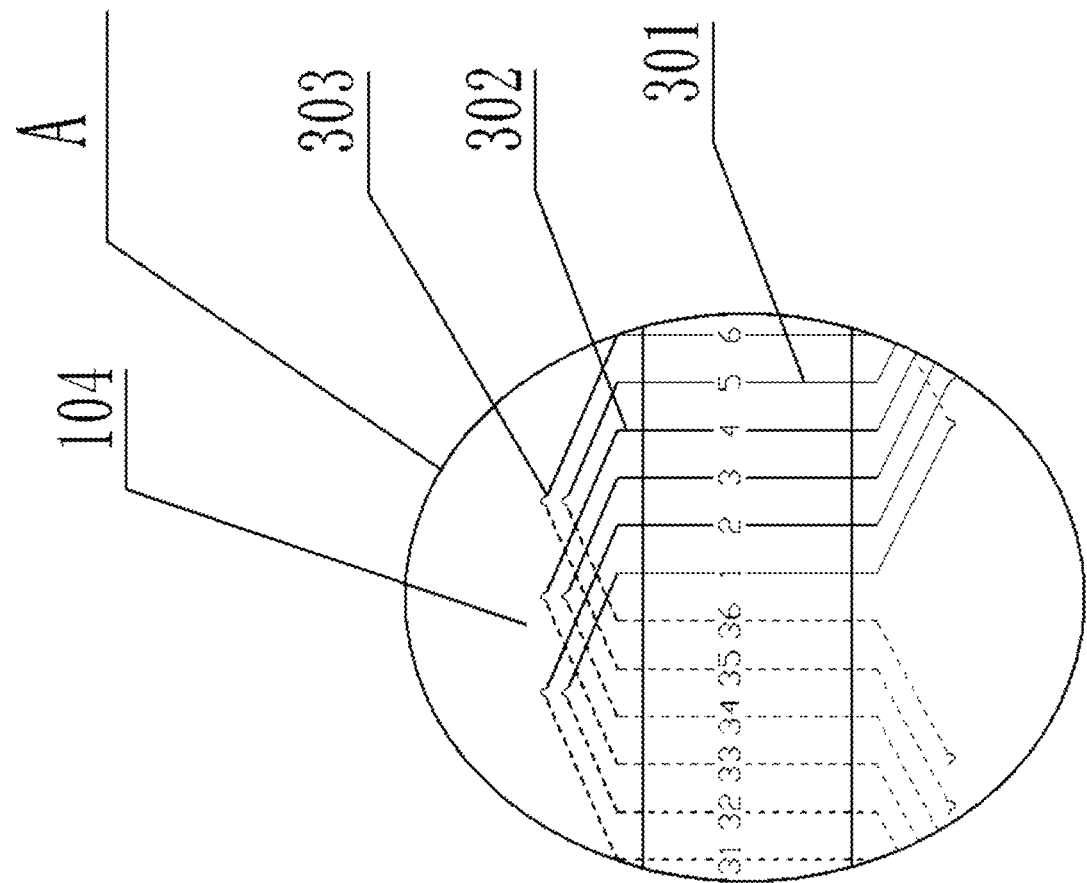
FIG. 5 is an enlarged schematic view of part A in FIG. 4.

Embodiment 1: taking a motor with 2 slots distributed per pole per phase as an example, a flat-wire continuous wave-wound staggered winding as shown in FIGS. 4 and 5 includes an incoming line end wire portion 101, an outgoing line end wire portion 102, and wound S-shaped wave wires 103 between the incoming line end wire portion 101 and the outgoing line end wire portion 102. The S-shaped wave wires 103 include an effective side portion 301 for placing in a stator slot body 503, a straight wire portion 302 located outside both sides of the slot body 503, and an end portion 303 connected to the adjacent straight wire portion 302, wherein a staggered winding portion 104 is provided in the S-shaped wave wires 103. The staggered winding portion 104 is arranged in a staggered manner between the wires in each phase of the wires. The staggered winding portion 104 is arranged in the middle of the entire wave wires. According to the number of slots q distributed per pole per phase which is 2, in the wave windings consisting of U-phase, V-phase, and W-phase windings and located in the S-shaped wave wires 103 in the middle of the entire wave wires, in the U-phase wires, the pitch $y_1$ of the $U_1$ wire is: $y_1 = q \times m + (q-1) = 2 \times 3 + (2-1) = 7$, and the pitch $y_2$ of the $U_2$ wire is: $y_2 = q \times m - 1 = 2 \times 3 - 1 = 5$; in the V-phase wires, the pitch $y_1'$ of the $V_1$ wire is: $y_1' = q \times m + (q-1) = 2 \times 3 + (2-1) = 7$, and the pitch $y_2'$ of the $V_2$ wire is: $y_2' = q \times m - 1 = 2 \times 3 - 1 = 5$; in the W-phase wires, the pitch $y_1''$ of the $W_1$ wire is: $y_1'' = q \times m + (q-1) = 2 \times 3 + (2-1) = 7$, and the pitch $y_2''$ of the $W_2$ wire is: $y_2'' = q \times m - 1 = 2 \times 3 - 1 = 5$. In the formulas, y represents the pitch, q represents the number of slots distributed per pole per phase, and m represents the number of phases. The same applies to the following description.

Taking the first group of S-shaped wave wires in the upper part of FIG. 4 as an example, in the wave windings in the S-shaped wave wires 103 in the middle of the entire wave wires, in the U-phase wires, $U_1$ is changed from the first slot to the last slot of the U-phase wires, i.e., the second slot, and $U_2$ is moved forward by one slot to change to the first slot. In this way, in the staggered winding portion 104 in the S-shaped wave wires 103 of the winding, the pitch of $U_1$ is changed from the original 6 to 7, and the pitch of $U_2$ is changed from the original 6 to 5.

In the W-phase wires, $W_1$ is changed from the $(q+1)^{th}$ slot, i.e., the third slot, to the last slot of the W-phase wires, which is $q+1+(q-1)$, i.e., the fourth slot, and the phase wire $W_2$ is moved forward by one slot to change to the $(q+1)^{th}$ slot, i.e., the third slot. In this way, in the staggered winding portion 104 of the S-shaped wave wires 103 in this section, the pitch of $W_1$ is changed from the original 6 to 7, and the pitch of $W_2$ is changed from the original 6 to 5.

In the V-phase wires, $V_1$ is changed from the $(2q+1)^{th}$ slot, i.e., the fifth slot, to the last slot of the V-phase wires, which is $2q+1+(q-1)$, i.e., the sixth slot, and phase wire $V_2$ is moved forward by one slot to change to the $(2q+1)^{th}$ slot, i.e., the fifth slot. In this way, in the staggered winding portion 104 of the S-shaped wave wires 103 in this section, the pitch of $V_1$ is changed from the original 6 to 7, and the pitch of $V_2$ is changed from the original 6 to 5.

In the second group of S-shaped wave wires shown in the lower part of FIG. 4, the winding method is the same.

The above method is also applicable to windings with three slots distributed per pole per phase, four slots distributed per pole per phase, five slots distributed per pole per phase, six slots distributed per pole per phase, seven slots distributed per pole per phase, etc.

Figure 6:
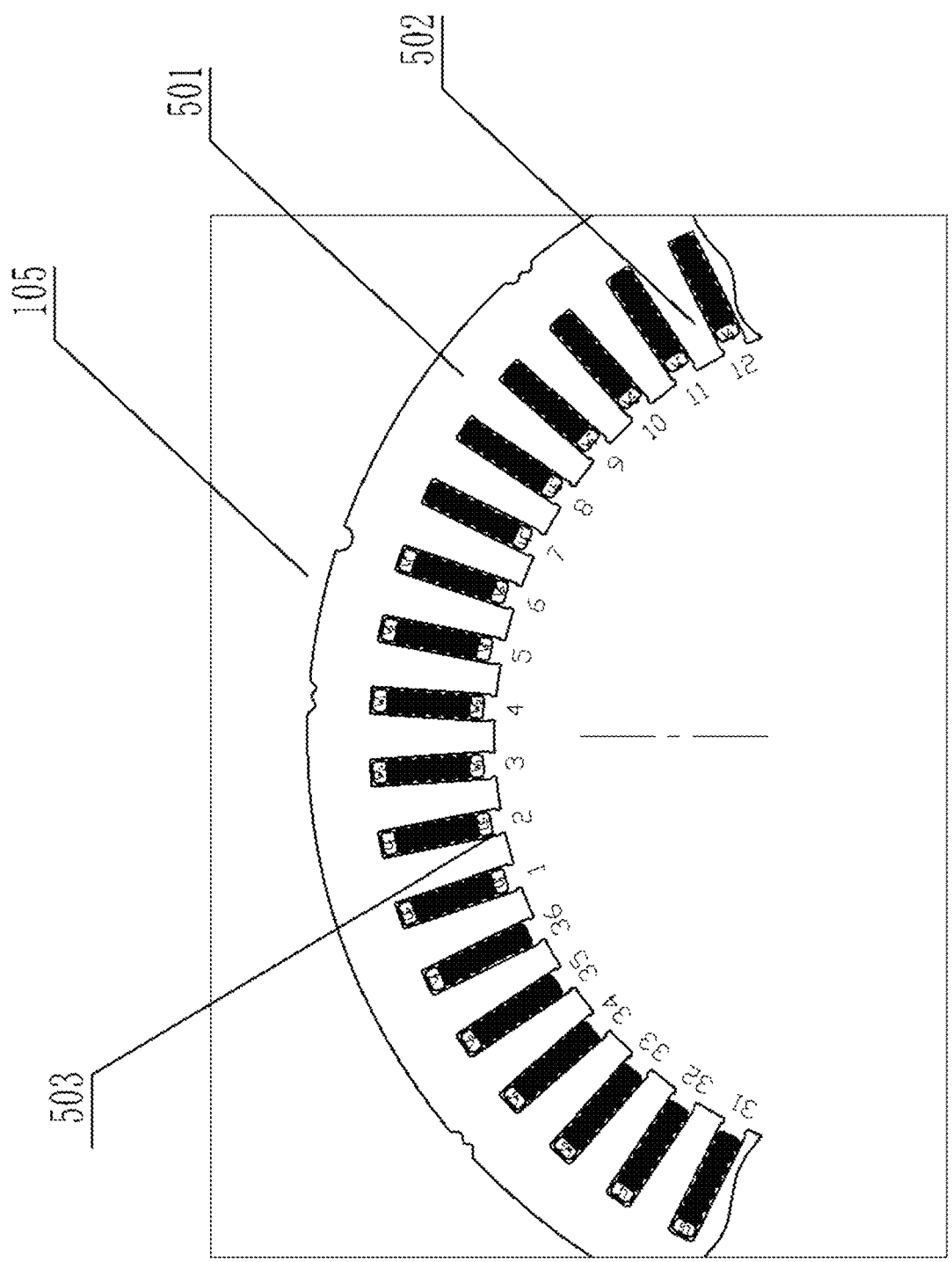
FIG. 6 is a partial schematic view of a stator winding according to the present invention.
Figure 7:
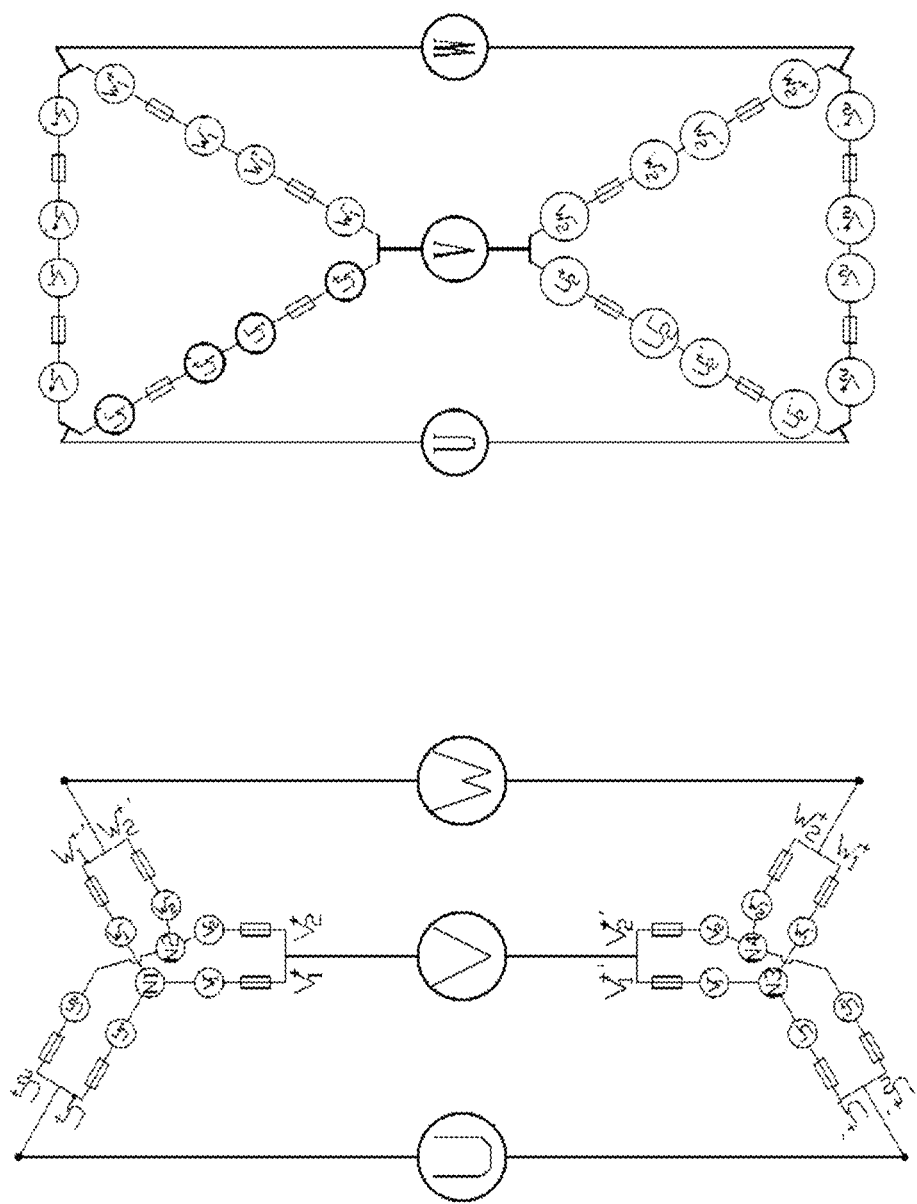
FIG. 7 is a single three-phase star connection diagram of a motor in embodiment 1 and a single three-phase delta connection diagram of the motor.
Figure 8:
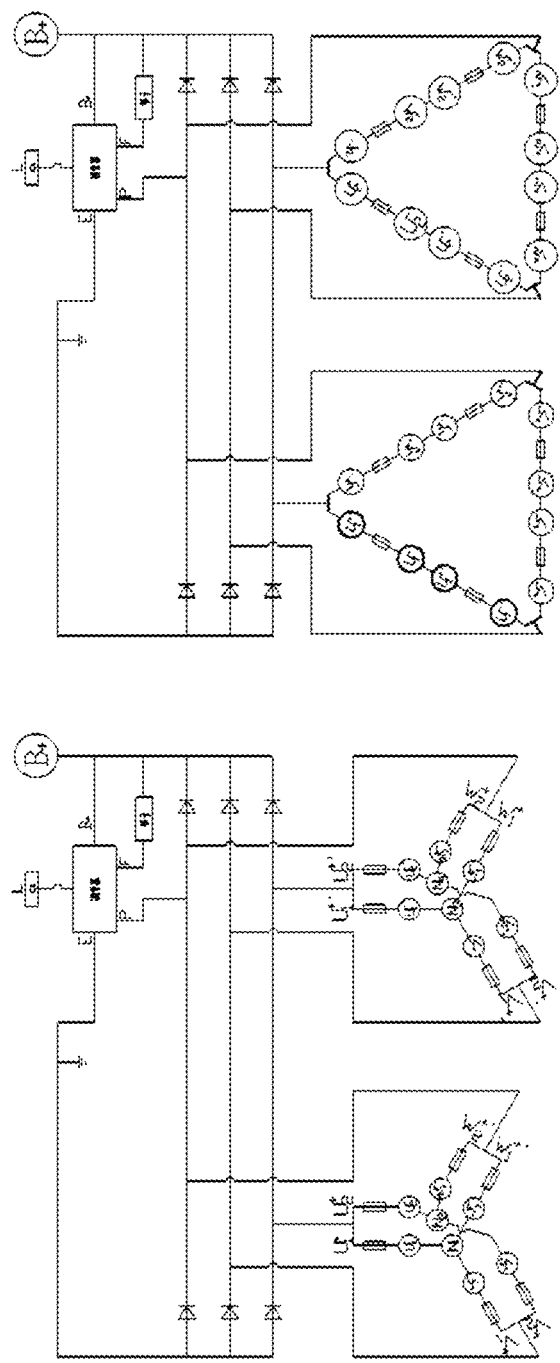
FIG. 8 is a single three-phase star connection diagram of a silicon rectifier alternator in embodiment 1 and a single three-phase delta connection diagram of the silicon rectifier alternator.

As shown in FIGS. 4, 5, and 6, taking a 36-slot motor stator as an example, the stator includes a stator core 105; the stator core 105 includes a yoke 501 and teeth 502; slot body 503 are provided in the circumferential direction of the stator core 105; slot insulating paper is provided in the slot body 503; a wire winding is provided in the slot insulating paper; the wire winding includes a flat-wire continuous wave-wound staggered winding; the flat-wire continuous wave-wound staggered winding includes an incoming line end wire portion 101, an outgoing line end wire portion 102, and wound S-shaped wave wires between the incoming line end wire portion 101 and the outgoing line end wire portion 102; the S-shaped wave wires 103 include an effective side portion 301 for placing in a stator slot body 503, a straight wire portion 302 located outside both sides of the slot body 503, and an end portion 303 connected to the adjacent straight wire portion 302; wherein a staggered winding portion 104 is provided in the S-shaped wave wires 103; the staggered winding portion 104 is arranged in a staggered manner between the wires in each phase of the wires. Through the staggered arrangement of the S-shaped wave wires 103, when the winding is placed in the stator, in the same pole phase group, currents on wires in different slots of the same phase winding can be kept synchronized. In this way, currents can flow in or out at the same time. Therefore, as shown in FIGS. 7 and 8, in the motor, only a single controller is needed for control, and in the silicon rectifier alternator, only a single rectifier bridge is needed for control.

Figure 9:
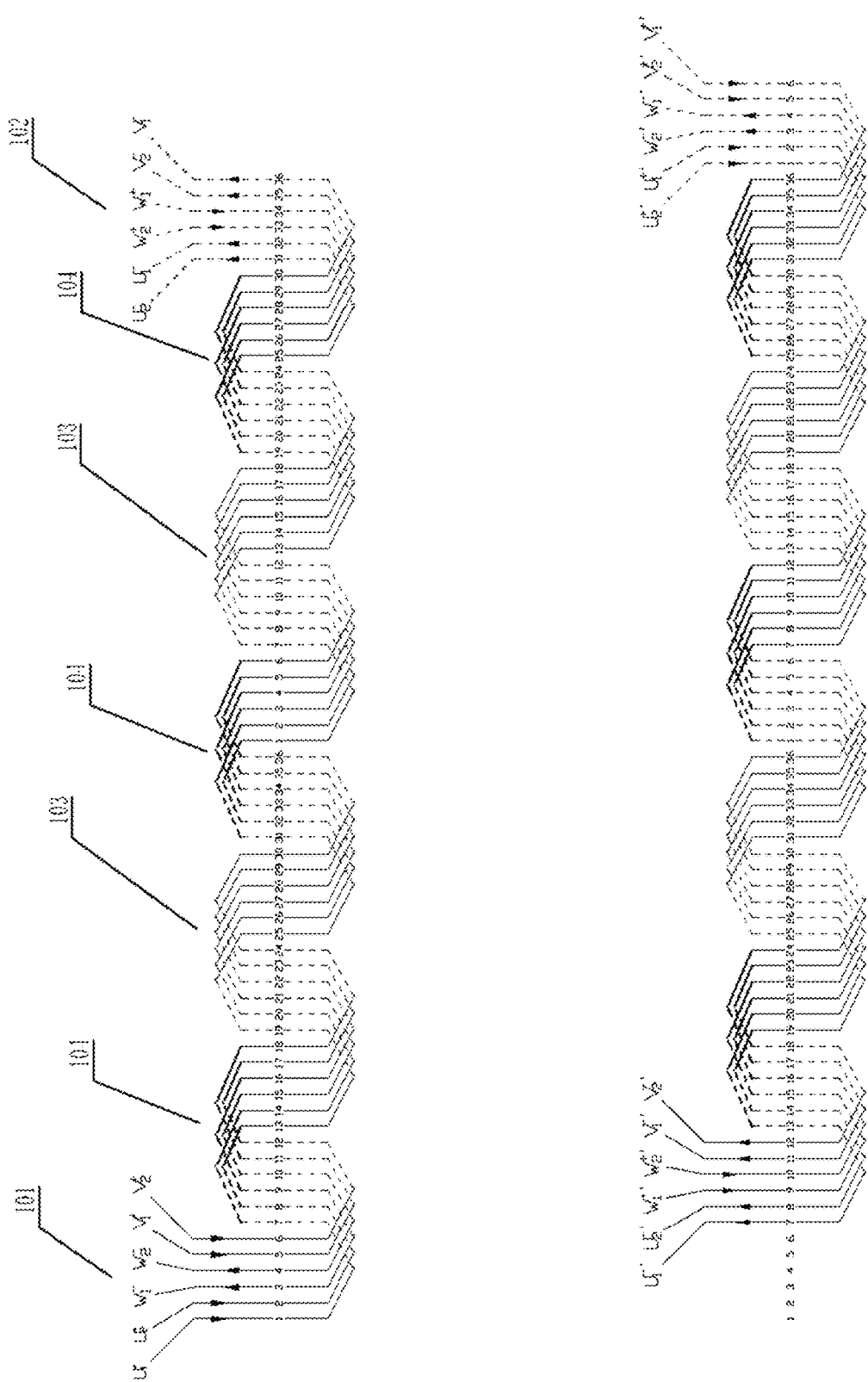
FIG. 9 is an expanded view of a winding in embodiment 2 of a flat-wire continuous wave-wound staggered winding according to the present invention.

Embodiment 2: taking a motor with 2 slots distributed per pole per phase as an example, a flat-wire continuous wave-wound staggered winding as shown in FIG. 9 has the same basic structure as in embodiment 1. Staggered winding portion 104 is provided in the S-shaped wave wires 103. However, for the staggered winding portion 104, according to the number of slots q distributed per pole per phase, one staggered winding portion 104 is provided in wave windings in the same direction consisting of U, V, and W three phases at an interval of one wave winding. Taking a 36-slot motor as an example, in the S-shaped wave wires 103, there are five wave windings in the same direction with the end portion 303 above the effective side portion 301, namely a first wave winding, a second wave winding, a third wave winding, a fourth wave winding, and a fifth wave winding. The first wave winding, the third wave winding and the fifth wave winding are set as staggered winding portion, respectively, that is, the first wave winding is set as a first staggered winding portion, the third wave winding is set as a second staggered winding portion, and the fifth wave winding is set as a third staggered winding portion. The winding mode of the first staggered winding portion, the second staggered winding portion, and the third staggered winding portion is the same as that in embodiment 1, that is, in the U-phase wires, the pitch $y_1$ of the $U_1$ wire is: $y_1$=q×m+(q−1)=2−3+(2−1)=7, and the pitch $y_2$ of the $U_2$ wire is: $y_2$=q×m−1=2×3−1=5; in the V-phase wires, the pitch $y_1'$ of the $V_1$ wire is: $y_1'$=q×m+(q−1)=2×3+(2−1)=7, and the pitch $y_2'$ of the $V_2$ wire is: $y_2'$=q×m−1=2×3−1=5; in the W-phase wires, the pitch $y_1''$ of the $W_1$ wire is: $y_1''$=q×m+(q−1)=2×3+(2−1)=7, and the pitch $y_2''$ of the $W_2$ wire is: $y_2''$=q×m−1=2×3−1=5. Moreover, the winding mode in the second wave winding and the fourth wave winding is the same as that in the prior art, that is, the pitch is 6 in each wire of each phase.

Taking a 36-slot motor stator as an example, by a winding mode of providing one staggered winding portion 104 in wave windings in the same direction at an interval of one wave winding, when the winding is placed in the stator, in the same pole phase group, currents on wires in different slots of the same phase winding can be kept synchronized. In this way, currents can flow in or out at the same time. Therefore, in a motor, only a single controller is needed for control, and in a silicon rectifier alternator, only a single rectifier bridge is needed for control, thereby simplifying motor circuits and reducing manufacturing costs. The second harmonic of a motor can be reduced, and noise of a motor can be reduced, thereby improving product quality.

Figure 10:
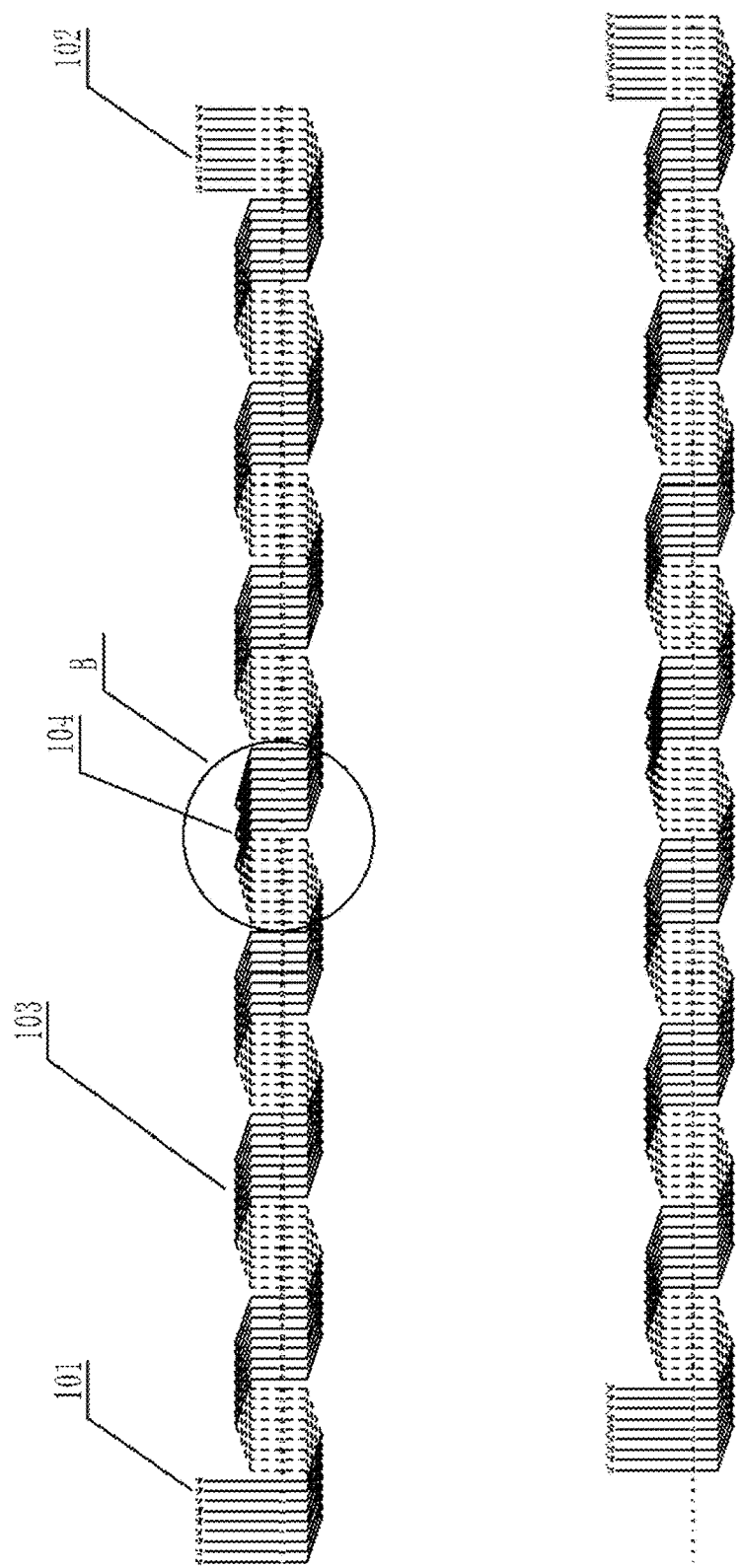
FIG. 10 is an expanded view of a winding in embodiment 3 of a flat-wire continuous wave-wound staggered winding according to the present invention.
Figure 11:
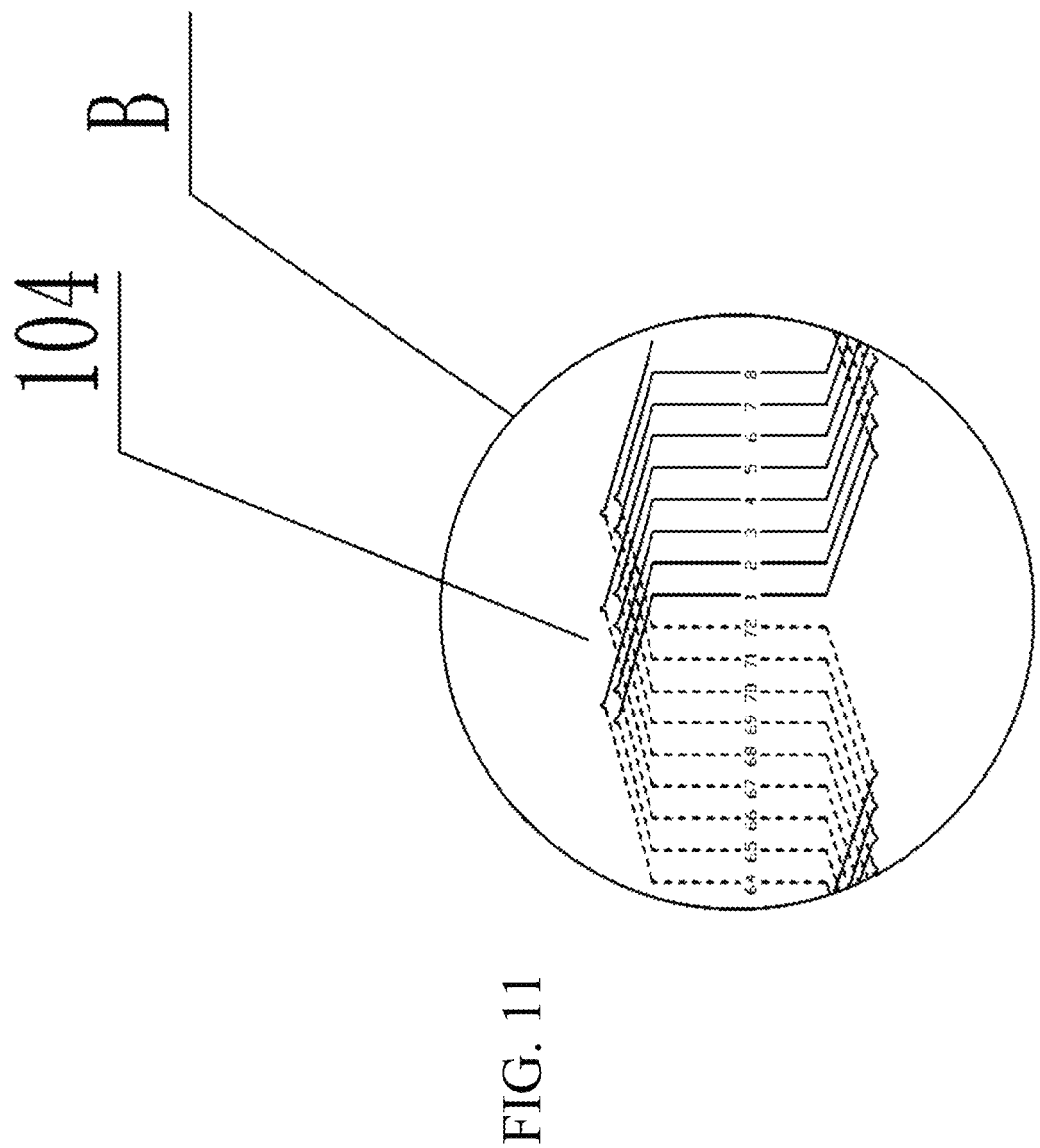
FIG. 11 is an enlarged schematic view of part B in FIG. 10.

Embodiment 3: taking a motor with 3 slots distributed per pole per phase as an example, a flat-wire continuous wave-wound staggered winding as shown in FIGS. 10 and 11 has the same structure as in embodiment 1. Staggered winding portion 104 is provided in the S-shaped wave wires 103. The staggered winding portion 104 is arranged in a staggered manner between the wires in each phase of the wires. The staggered winding portion 104 is arranged in the middle of the entire wave wires. According to the number of slots q distributed per pole per phase which is 3, in the wave windings consisting of U-phase, V-phase, and W-phase windings and located in the S-shaped wave wires 103 in the middle of the entire wave wires, in the U-phase wires, the pitch $y_1$ of the $U_1$ wire is: $y_1$=q×m+(q−1)=3×3+(3−1)=11, the pitch $y_2$ of the $U_2$ wire is: $y_2$=q×m−1=3×3−1=8, and the pitch $y_3$ of the $U_3$ wire is: $y_3$=q>m−1=3×3−1=8; in the V-phase wires, the pitch $y_1'$ of the $V_1$ wire is: $y_13$=q×m+(q−1)=3×3+(3−1)=11, and the pitch $y_2'$ of the $V_2$ wire is: $y_2'$=q×m−1=3×3−1=8; in the W-phase wires, the pitch $y_1''$ of the $W_1$ wire is: $y_1''$=q×m+(q−1)=3×3+(3−1)=11, and the pitch $y_2''$ of the $W_2$ wire is: $y_2''$=q×m−1=3×3−1=8. For other windings, the pitch of each wire of each phase is 9.

Taking the first group of S-shaped wave wires in the upper part of FIG. 10 as an example, for the staggered winding portion 104 in the S-shaped wave wires 103 in the middle of the entire wave wires, in the U-phase wires, $U_1$ is changed from the first slot to the last slot of the U-phase wires, i.e., the third slot, $U_2$ is moved forward by one slot to change to the first slot, and $U_3$ is moved forward by one slot to change to the second slot. In this way, in the S-shaped wave wires 103 of the winding, the pitch of $U_1$ is changed from the original 9 to 11, the pitch of $U_2$ is changed from the original 9 to 8, and the pitch of $U_3$ is changed from the original 9 to 8.

In the W-phase wires, $W_1$ is changed from the $(q+1)^{th}$ slot, i.e., the fourth slot, to the last slot of the W-phase wires, which is q+1+(q−1), i.e., the sixth slot, the phase wire $W_2$ is moved forward by one slot to change to the $(q+1)^{th}$ slot, i.e., the fourth slot, and $W_3$ is changed to the $(q+2)^{th}$ slot, i.e., the fifth slot. In this way, in the S-shaped wave wires 103 in the winding, the pitch of $W_1$ is changed from the original 9 to 11, the pitch of $W_2$ is changed from the original 9 to 8, and the pitch of $W_3$ is changed from the original 9 to 8.

In the V-phase wires, $V_1$ is changed from the $(2q+1)^{th}$ slot, i.e., the seventh slot, to the last slot of the V-phase wires, which is 2q+1+(q−1), i.e., the ninth slot, the phase wire $V_2$ is moved forward by one slot to change to the $(2q+1)^{th}$ slot, i.e., the seventh slot, and the phase wire $V_3$ is moved forward by one slot to change to the $(2q+1)^{th}$ slot, i.e., the eighth slot. In this way, in the S-shaped wave wires 103 in the winding, the pitch of $V_1$ is changed from the original 9 to 11, the pitch of $V_2$ is changed from the original 9 to 8, and the pitch of $V_3$ is changed from the original 9 to 8.

In the second group of S-shaped wave wires in the lower part of FIG. 10, the winding method is the same.

Taking a 72-slot motor stator as an example, the stator structure is the same as that in embodiment 1. Staggered winding portion 104 is provided in the S-shaped wave wires 103. The staggered winding portion 104 is arranged in a staggered manner between the wires in each phase of the wires. Through the staggered arrangement of the staggered winding portion 104, when the winding is placed in the stator, in the same pole phase group, currents on wires in different slots of the same phase winding can be kept synchronized. In this way, currents can flow in or out at the same time. Therefore, in a motor, only a single controller is needed for control, in a silicon rectifier alternator, only a single rectifier bridge is needed for control, and the purpose of single three-phase control is achieved.

Figure 12:
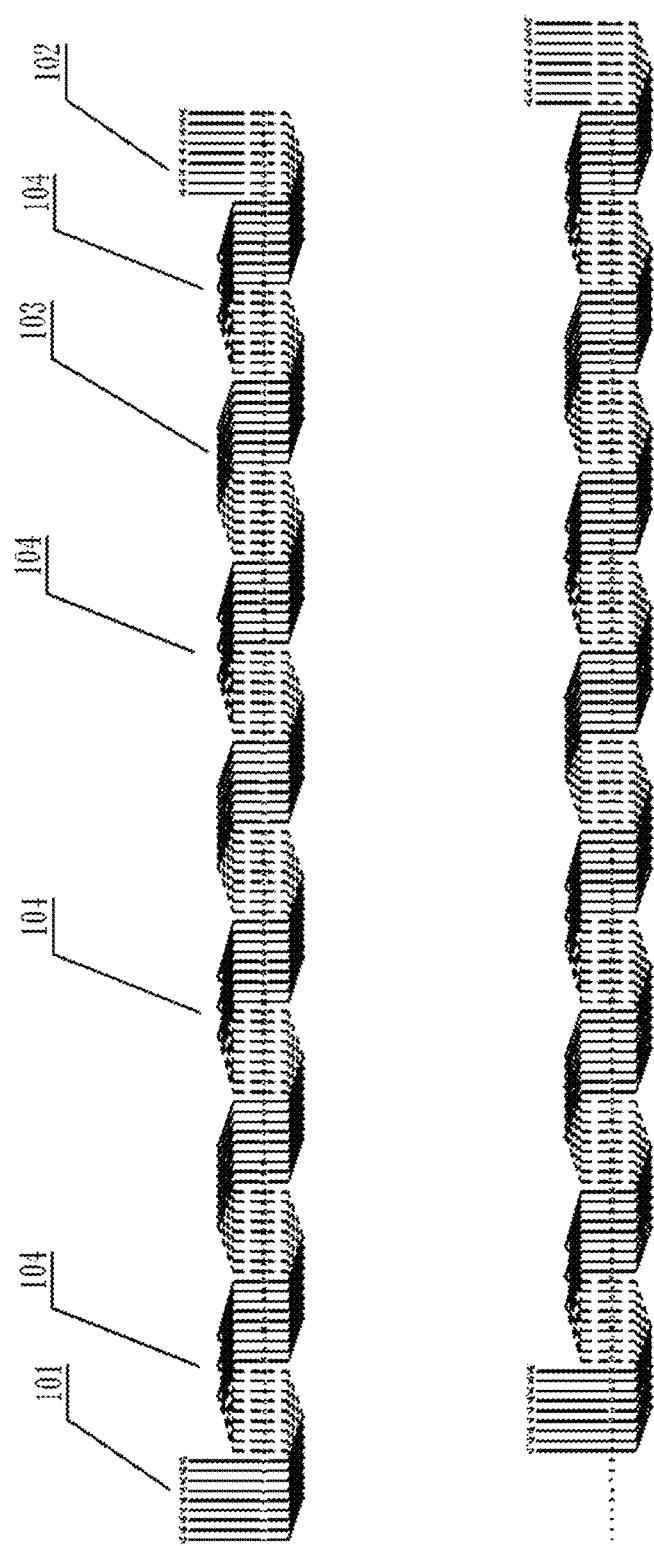
FIG. 12 is an expanded view of a winding in embodiment 4 of a flat-wire continuous wave-wound staggered winding according to the present invention.

Embodiment 4: taking a motor with 3 slots distributed per pole per phase as an example, a flat-wire continuous wave-wound staggered winding as shown in FIG. 12 has the same basic structure as in embodiment 1. Staggered winding portion 104 is provided in the S-shaped wave wires 103. However, for the staggered winding portion 104, according to the number of slots q distributed per pole per phase, one staggered winding portion 104 is provided in wave windings in the same direction consisting of U, V, and W three phases at an interval of one wave winding. Taking a 72-slot motor as an example, in the S-shaped wave wires 103, there are seven wave windings in the same direction with the end portion 303 above the effective side portion 301, namely a first wave winding, a second wave winding, a third wave winding, a fourth wave winding, a fifth wave winding, a sixth wave winding, and a seventh wave winding. The first wave winding, the third wave winding, the fifth wave winding, and the seventh wave winding are set as staggered winding portion, respectively, that is, the first wave winding is set as a first staggered winding portion, the third wave winding is set as a second staggered winding portion, the fifth wave winding is set as a third staggered winding portion, and the seventh wave winding is set as a fourth staggered winding portion. The winding mode of the first staggered winding portion, the second staggered winding portion, the third staggered winding portion, and the fourth staggered winding portion is the same as that in embodiment 1, that is, in the U-phase wires, the pitch $y_1$ of the $U_1$ wire is: $y_1=q\times m+(q-1)=3\times 3+(3-1)=11$, the pitch $y_2$ of the $U_2$ wire is: $y_2=q\times m-1=3\times 3-1=8$, and the pitch $y_3$ of the $U_3$ wire is: $y_3=q\times m-1=3\times 3-1=8$; in the V-phase wires, the pitch $y_1'$ of the $V_1$ wire is: $y_1'=q\times m+(q-1)=3\times 3+(3-1)=11$, the pitch $y_2'$ of the $V_2$ wire is: $y_2'=q\times m-1=3\times 3-1=8$, and the pitch $y_3'$ of the $V_3$ wire is: $y_3'=q\times m-1=3\times 3-1=8$; in the W-phase wires, the pitch $y_1''$ of the $W_1$ wire is: $y_1''=q\times m+(q-1)=3\times 3+(3-1)=11$, the pitch $y_2''$ of the $W_2$ wire is: $y_2''=q\times m-1=3\times 3-1=8$, and the pitch $y_3''$ of the $W_3$ wire is: $y_3''=q\times m-1=3\times 3-1=8$. Moreover, the winding mode in the second wave winding, the fourth wave winding, and the sixth wave winding is the same as that in the prior art, that is, the pitch is 9 in each wire of each phase.

Taking a 72-slot motor stator as an example, by a winding mode of providing one staggered winding portion 104 in wave windings in the same direction at an interval of one wave winding, when the winding is placed in the stator, in the same pole phase group, currents on wires in different slots of the same phase winding can be kept synchronized. In this way, currents can flow in or out at the same time. Therefore, in a motor, only a single controller is needed for control, and in a silicon rectifier alternator, only a single rectifier bridge is needed for control, thereby simplifying motor circuits and reducing manufacturing costs. The second harmonic of a motor can be reduced, and noise of a motor can be reduced, thereby improving product quality.

Figure 13:
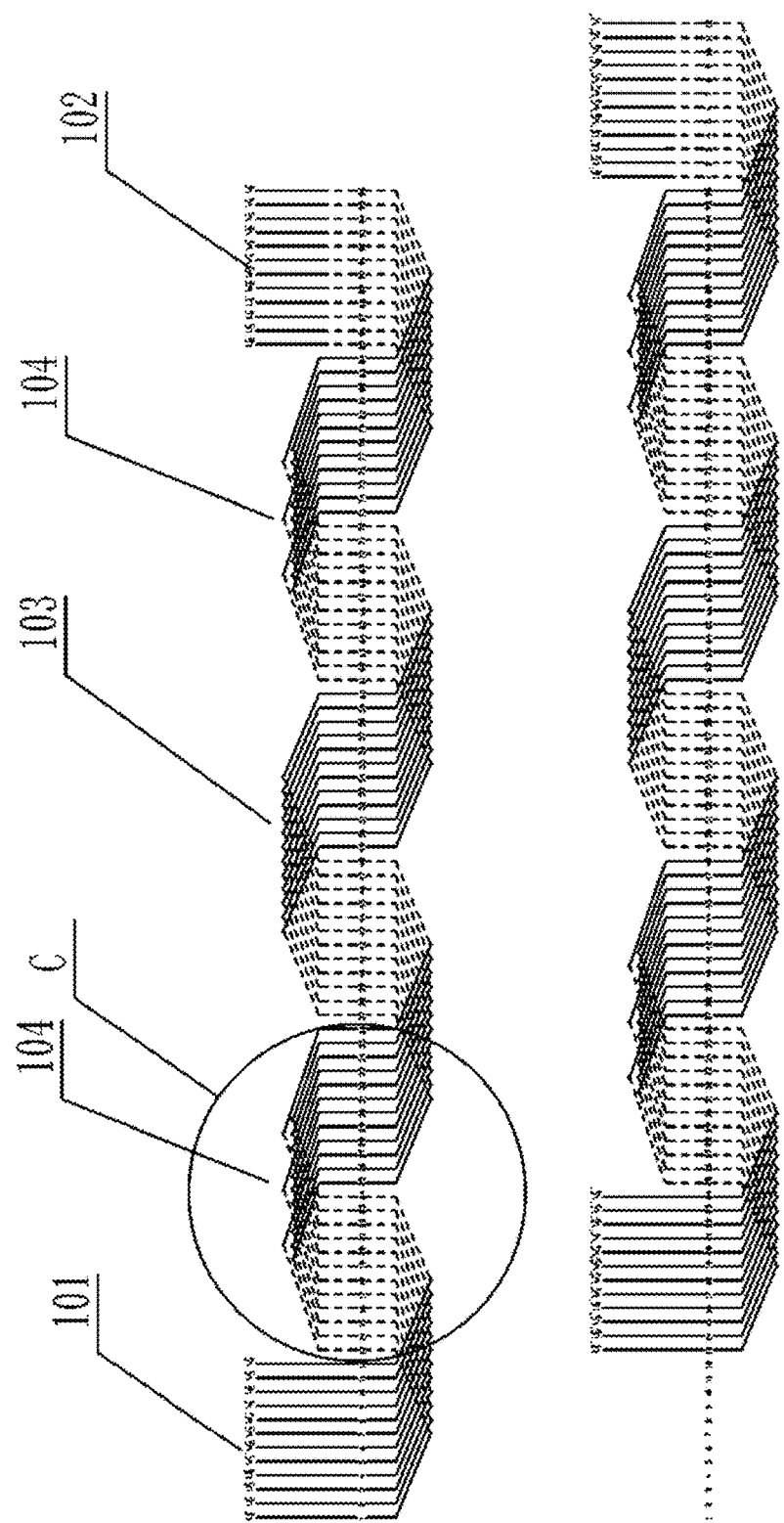
FIG. 13 is an expanded view of a winding in embodiment 5 of a flat-wire continuous wave-wound staggered winding according to the present invention.
Figure 14:
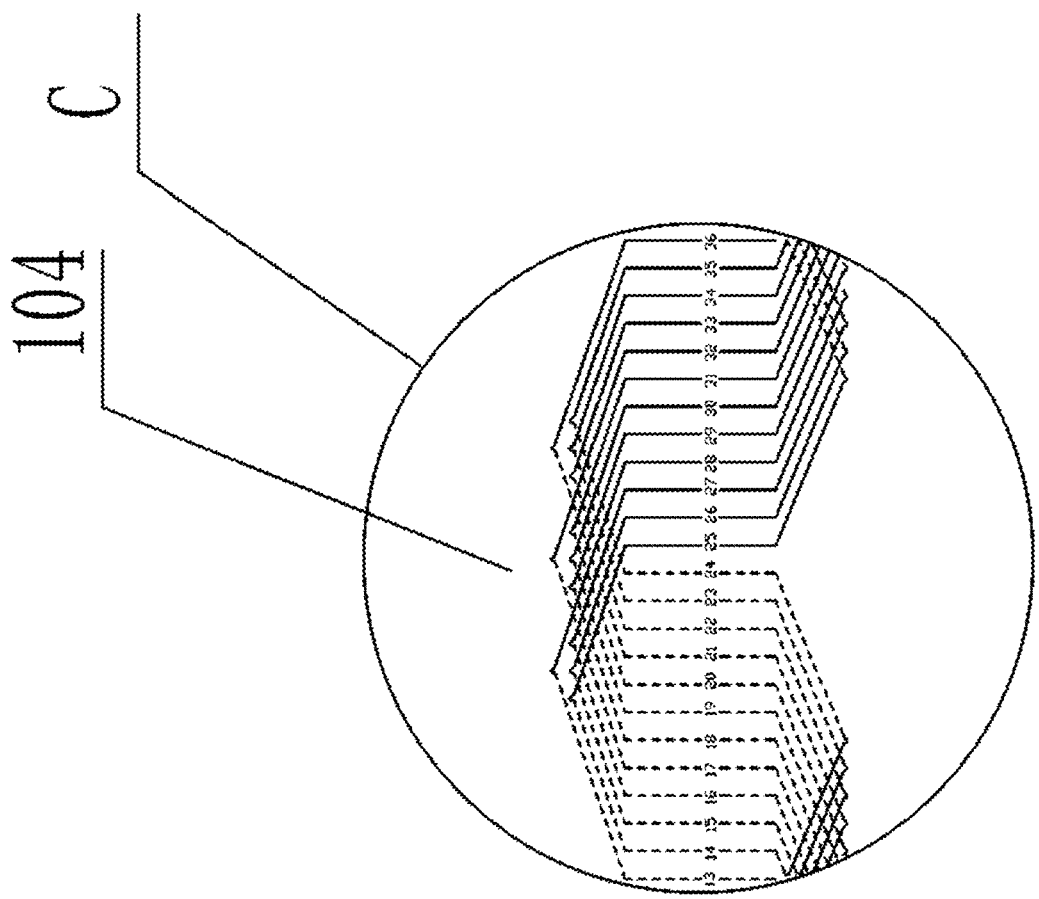
FIG. 14 is an enlarged schematic view of part C in FIG. 13.

Embodiment 5: taking a motor with 4 slots distributed per pole per phase as an example, a flat-wire continuous wave-wound staggered winding as shown in FIGS. 13 and 14 has the same basic structure as in embodiment 1. Staggered winding portion 104 is provided in the S-shaped wave wires 103. However, for the staggered winding portion 104, according to the number of slots q distributed per pole per phase, one staggered winding portion 104 is provided in wave windings in the same direction consisting of U, V, and W three phases at an interval of one wave winding. Taking a 96-slot motor as an example, in the S-shaped wave wires 103, there are three wave windings in the same direction with the end portion 303 above the effective side portion 301, namely a first wave winding, a second wave winding, and a third wave winding. The first wave winding and the third wave winding are set as staggered winding portion, respectively, that is, the first wave winding is set as a first staggered winding portion, and the third wave winding is set as a second staggered winding portion. The winding mode of the first staggered winding portion and the second staggered winding portion is the same as that in embodiment 1, that is, in the U-phase wires, the pitch $y_1$ of the $U_1$ wire is: $y_1=q\times m+(q-1)=4\times 3+(4-1)=15$, the pitch $y_2$ of the $U_2$ wire is: $y_2=q\times m-1=4\times 3-1=11$, the pitch $y_3$ of the $U_3$ wire is: $y_3=q\times m-1=4\times 3-1=11$, and the pitch $y_4$ of the $U_4$ wire is: $y_4=q\times m-1=4\times 3-1=11$; in the V-phase wires, the pitch $y_1'$ of the $V_1$ wire is: $y1'=q\times m+(q-1)=4\times 3+(4-1)=15$, the pitch $y_2'$ of the $V_2$ wire is: $y_2'=q\times m-1=4\times 3-1=11$, the pitch $y_3'$ of the $V_3$ wire is: $y_3'=q\times m-1=4\times 3-1=11$, and the pitch $y_4'$ of the $V_4$ wire is: $y_4'=q\times m-1=4\times 3-1=11$; in the W-phase wires, the pitch $y_1''$ of the $W_1$ wire is: $y_1''=q\times m+(q-1)=4\times 3+(4-1)=15$, the pitch $y_2''$ of the $W_2$ wire is: $y_2''=q\times m-1=4\times 3-1=11$, and the pitch $y_3''$ of the $W_3$ wire is: $y_3''=q\times m-1=4\times 3-1=11$. Moreover, the winding mode in the second wave winding is the same as that in the prior art, that is, the pitch is 12 in each wire of each phase.

Taking a 96-slot motor stator as an example, by a winding mode of providing one staggered winding portion 104 in wave windings in the same direction at an interval of one wave winding, when the winding is placed in the stator, in the same pole phase group, currents on wires in different slots of the same phase winding can be kept synchronized. In this way, currents can flow in or out at the same time. Therefore, in a motor, only a single controller is needed for control, and in a silicon rectifier alternator, only a single rectifier bridge is needed for control, thereby simplifying motor circuits and reducing manufacturing costs. The second harmonic of a motor can be reduced, and noise of a motor can be reduced, thereby improving product quality.

The above winding method is also applicable to generator and motor windings with 5 slots distributed per pole per phase, 6 slots distributed per pole per phase, and 7 slots distributed per pole per phase of a three-phase motor.

The implementations of the present invention are described in detail above with reference to the accompanying drawings, but the present invention is not limited to the above implementations. For a person of ordinary skill in the art, several modifications and improvements can be made without departing from the present invention, which should also be regarded as belonging to the scope of protection of the present invention.

The invention claimed is:
1. A flat-wire continuous wave-wound staggered winding, consisting of an incoming line end wire portion, an outgoing line end wire portion, and S-shaped wave wires continuously wound between the incoming line end wire portion and the outgoing line end wire portion, wherein the S-shaped wave wires comprise an effective side portion for placing in a stator slot body, a straight wire portion located outside both sides of the slot body, and an end portion connected to the adjacent straight wire portion; wherein a staggered winding portion is provided in the S-shaped wave wires, and the staggered winding portion is arranged in a staggered manner between the wires in each phase of the wires, wherein the staggered winding portion is arranged in a middle of an entire S-shaped wave wires, according to a number of slots q distributed per pole per phase, in the wave windings consisting of U-phase, V-phase, and W-phase windings, in a U-phase wire, a pitch $y_1$ of a $U_1$ wire is set as: $y_1=q\times m+(q-1)$, in the formula, y represents a pitch, q represents the number of slots distributed per pole per phase, m represents a number of phases; and a pitch $y_a$ of a Ua wire is set as: $y_a=q\times m-1$, wherein a is set as 2 to 7;

in a V-phase wire, a pitch y1' of the $V_1$ wire is set as: $y1'=q\times m+(q-1)$; and a pitch $y_a'$ of a Va wire is set as: $y_a'=q\times m-1$, wherein a is set as 2 to 7;

in a W-phase wire, a pitch $y_1''$ of the $W_1$ wire is set as: $y_1''=q\times m+(q-1)$; and a pitch $y_a''$ of a Wa wire is set as: $y_a''=q\times m-1$, wherein a is set as 2 to 7.

2. The flat-wire continuous wave-wound staggered winding according to claim 1, wherein the staggered winding portion is provided in wave windings in the same direction in the S-shaped wave wires at an interval of one wave winding.

3. A stator comprising:

a flat-wire continuous wave-wound staggered winding, consisting of:

an incoming line end wire portion, an outgoing line end wire portion, and S-shaped wave wires continuously wound between the incoming line end wire portion and the outgoing line end wire portion, wherein the S-shaped wave wires comprise an effective side portion for placing in a stator slot body, a straight wire portion located outside both sides of the slot body, and an end portion connected to the adjacent straight wire portion; wherein a staggered winding portion is provided in the S-shaped wave wires, and the staggered winding portion is arranged in a staggered manner between the wires in each phase of the wires;

a stator core, wherein the stator core comprises a yoke and a teeth, a slot body is provided in the circumferential direction of the stator core, slot insulating paper is provided in the slot body, and a wire winding is provided in the slot insulating paper, wherein the wire winding is a flat-wire continuous wave-wound staggered winding consisting of an incoming line end wire portion, an outgoing line end wire portion, and S-shaped wave wires continuously wound between the incoming line end wire portion and the outgoing line end wire portion;

wherein the S-shaped wave wires comprises an effective side portion for placing in stator slot body, a straight wire portion located outside both sides of the slot body, and an end portion connected to an adjacent straight wire portion; wherein a staggered winding portion is provided in the S-shaped wave wires, and the staggered winding portion is arranged in a staggered manner between the wires in each phase of the wires, wherein according to the number of slots q distributed per pole per phase, the staggered winding portion is provided in wave windings in the same direction consisting of U, V, and W three phases at an interval of one wave winding, the staggered winding portion is in the winding consisting of U-phase, V-phase, and W-phase windings, in a U-phase wire, a pitch $y_1$ of the $U_1$ wire is set as: $y_1=q\times m+(q-1)$, in the formula, y represents a pitch, q represents the number of slots distributed per pole per phase, and m represents the number of phases; and a pitch $y_a$ of the Ua wire is set as: $y_a=q\times m-1$, wherein a is set as 2 to 7;

in a V-phase wire, a pitch $y_1'$ of the $V_1$ wire is set as: $y_1'=q\times m+(q-1)$; and a pitch $y_a'$ of the Va wire is set as: $y_a'=q\times m-1$, wherein a is set as 2 to 7; and in a W-phase wire, a pitch $y_1''$ of the $W_1$ wire is set as: $y_1''=q\times m+(q-1)$; and a pitch $y_a''$ of the Wa wire is set as: $y_a''=q\times m-1$, wherein a is set as 2 to 7.

4. A stator comprising:

a flat-wire continuous wave-wound staggered winding, consisting of:

an incoming line end wire portion, an outgoing line end wire portion, and S-shaped wave wires continuously wound between the incoming line end wire portion and the outgoing line end wire portion, wherein the S-shaped wave wires comprise an effective side portion for placing in a stator slot body, a straight wire portion located outside both sides of the slot body, and an end portion connected to the adjacent straight wire portion; wherein a staggered winding portion is provided in the S-shaped wave wires, and the staggered winding portion is arranged in a staggered manner between the wires in each phase of the wires;

a stator core, wherein the stator core comprises a yoke and a teeth, a slot body is provided in the circumferential direction of the stator core, slot insulating paper is provided in the slot body, and a wire winding is provided in the slot insulating paper, wherein the wire winding is a flat-wire continuous wave-wound staggered winding consisting of an incoming line end wire portion, an outgoing line end wire portion, and S-shaped wave wires continuously wound between the incoming line end wire portion and the outgoing line end wire portion;

wherein the S-shaped wave wires comprises an effective side portion for placing in stator slot body, a straight wire portion located outside both sides of the slot body, and an end portion connected to an adjacent straight wire portion; wherein a staggered winding portion is provided in the S-shaped wave wires, and the staggered winding portion is arranged in a staggered manner between the wires in each phase of the wires, wherein according to the number of slots q distributed per pole per phase, the staggered winding portion is provided in wave windings in the same direction consisting of U, V, and W three phases at an interval of one wave winding, the staggered winding portion is in the winding consisting of U-phase, V-phase, and W-phase windings, in a U-phase wire, a pitch $y_1$ of the $U_1$ wire is set as: $y_1 = q \times m + (q-1)$,
in the formula, y represents a pitch,
q represents the number of slots distributed per pole per phase, and
m represents the number of phases; and
a pitch $y_a$ of the Ua wire is set as: $y_a = q \times m - 1$,
wherein a is set as 2 to 7;
in a V-phase wire, a pitch $y_1'$ of the $V_1$ wire is set as: $y_1' = q \times m + (q-1)$; and
a pitch $y_a'$ of the Va wire is set as: $y_a' = q \times m - 1$,
wherein a is set as 2 to 7; and
in a W-phase wire, a pitch $y_1''$ of the $W_1$ wire is set as: $y_1'' = q \times m + (q-1)$; and
a pitch $y_a''$ of the Wa wire is set as: $y_a'' = q \times m - 1$,
wherein a is set as 2 to 7.

\* \* \* \* \*